US009032255B2

(12) United States Patent
Tanaka

(10) Patent No.: US 9,032,255 B2
(45) Date of Patent: May 12, 2015

(54) SEMICONDUCTOR DEVICE AND CONTROL METHOD THEREOF

(71) Applicant: Renesas Electronics Corporation, Kawasaki-shi, Kanagawa (JP)

(72) Inventor: Kentaro Tanaka, Kawasaki (JP)

(73) Assignee: Renesas Electronics Corporation, Kanagawa (JP)

(*) Notice: Subject to any disclaimer, the term of this patent is extended or adjusted under 35 U.S.C. 154(b) by 94 days.

(21) Appl. No.: 13/678,080

(22) Filed: Nov. 15, 2012

(65) Prior Publication Data

US 2013/0159783 A1    Jun. 20, 2013

(30) Foreign Application Priority Data

Dec. 14, 2011    (JP) ................................ 2011-273295

(51) Int. Cl.
| | |
|---|---|
| *G06F 11/00* | (2006.01) |
| *G06F 11/34* | (2006.01) |
| *G06F 11/36* | (2006.01) |

(52) U.S. Cl.
CPC ........ *G06F 11/3471* (2013.01); *G06F 11/3636* (2013.01); *G06F 11/349* (2013.01)

(58) Field of Classification Search
CPC . G06F 9/3885; G06F 11/364; G06F 9/30145; G06F 11/3476; G06F 11/3636
USPC .......................................................... 714/45
See application file for complete search history.

(56) References Cited

U.S. PATENT DOCUMENTS

| | | | | |
|---|---|---|---|---|
| 2004/0172519 A1* | 9/2004 | Nakajima | ...................... | 712/209 |
| 2005/0289515 A1* | 12/2005 | Sudo et al. | ..................... | 717/124 |
| 2009/0222646 A1* | 9/2009 | Ohba et al. | ..................... | 712/227 |

FOREIGN PATENT DOCUMENTS

| | | |
|---|---|---|
| EP | 0 530 816 A2 | 3/1993 |
| JP | 5-224989 A | 9/1993 |

* cited by examiner

*Primary Examiner* — Jigar Patel
(74) *Attorney, Agent, or Firm* — Sughrue Mion, PLLC

(57) ABSTRACT

Provided is a semiconductor device including: a first memory that stores multiple instructions; a second memory that stores multiple data items; first and second buses; a microprocessor that fetches, through the first bus, an instruction at a specified address among the multiple instructions stored in the first memory, executes the instruction, and accesses the second memory through the second bus based on a result of the execution; and a trace information output unit that acquires, when a branch instruction is generated in the microprocessor, address information of the first memory specified before branching, and outputs the information as trace information. The trace information output from the trace information output unit is written into the second memory through the second bus in a period in which the microprocessor does not access the second memory during execution of the branch instruction.

12 Claims, 6 Drawing Sheets

SEMICONDUCTOR DEVICE AND CONTROL METHOD THEREOF

CROSS-REFERENCE TO RELATED APPLICATIONS

This application is based upon and claims the benefit of priority from Japanese patent application No. 2011-273295, filed on Dec. 14, 2011, the disclosure of which is incorporated herein in its entirety by reference.

BACKGROUND

The present invention relates to a semiconductor device and a control method thereof, and more particularly, to a semiconductor device having a real-time trace function and a control method thereof.

To debug a program in a microcomputer, it is effective to hold a history (hereinafter referred to as "trace information") of a program counter to be executed by the microprocessor. This trace information is analyzed afterwards to thereby debug the program. In addition, in recent years, there is a demand for holding the trace information in real time without interrupting the operation of the microcomputer. That is, there is a demand for having a real-time trace function.

Japanese Unexamined Patent Application Publication No. 05-224989 discloses a related art. FIG. 6 is a diagram illustrating a trace system disclosed in Japanese Unexamined Patent Application Publication No. 05-224989. In the trace system illustrated in FIG. 6, a trace analyzer 103 loads a mode display signal 105, an instruction execution start signal 106, a branch instruction generation signal 107, and an interrupt branch generation signal 108, each of which is output from a microprocessor 101. The trace analyzer 103 writes address information, which is acquired based on these pieces of information, into a trace memory 104, thereby tracing instructions. This enables the trace system illustrated in FIG. 6 to hold the trace information without interrupting the operation of the microprocessor 101.

SUMMARY

In the trace system illustrated in FIG. 6, however, it is necessary to provide another dedicated memory (trace memory 104) for holding the trace information, which causes a problem of an increase in cost.

A first aspect of the present invention is a semiconductor device including: a first memory that stores a plurality of instructions; a second memory that stores a plurality of data items; a first bus and a second bus; a microprocessor that fetches, through the first bus, an instruction at a specified address among the plurality of instructions stored in the first memory, executes the instruction, and accesses the second memory through the second bus based on a result of the execution; and a trace information output unit that acquires, when a branch instruction is generated in the microprocessor, address information of the first memory specified before branching, and outputs the information as trace information. The trace information output from the trace information output unit is written into the second memory through the second bus in a period in which the microprocessor does not access the second memory during execution of the branch instruction.

A second aspect of the present invention is a control method of a semiconductor device, the semiconductor device including: a first memory that stores a plurality of instructions; a second memory that stores a plurality of data items; a first bus and a second bus; a microprocessor that fetches, through the first bus, an instruction at a specified address among the plurality of instructions stored in the first memory, executes the instruction, and accesses the second memory through the second bus based on a result of the execution; and a trace information output unit that outputs trace information, the method including: acquiring, when a branch instruction is generated in the microprocessor, address information of the first memory specified before branching, and outputting the information as the trace information; and writing the trace information output from the trace information output unit into the second memory through the second bus in a period in which the microprocessor does not access the second memory during execution of the branch instruction.

The circuit configuration as described above enables implementation of a real-time trace function and suppression of an increase in cost.

According to the present invention, it is possible to provide a semiconductor device capable of implementing a real-time trace function and suppressing an increase in cost, and a control method thereof.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
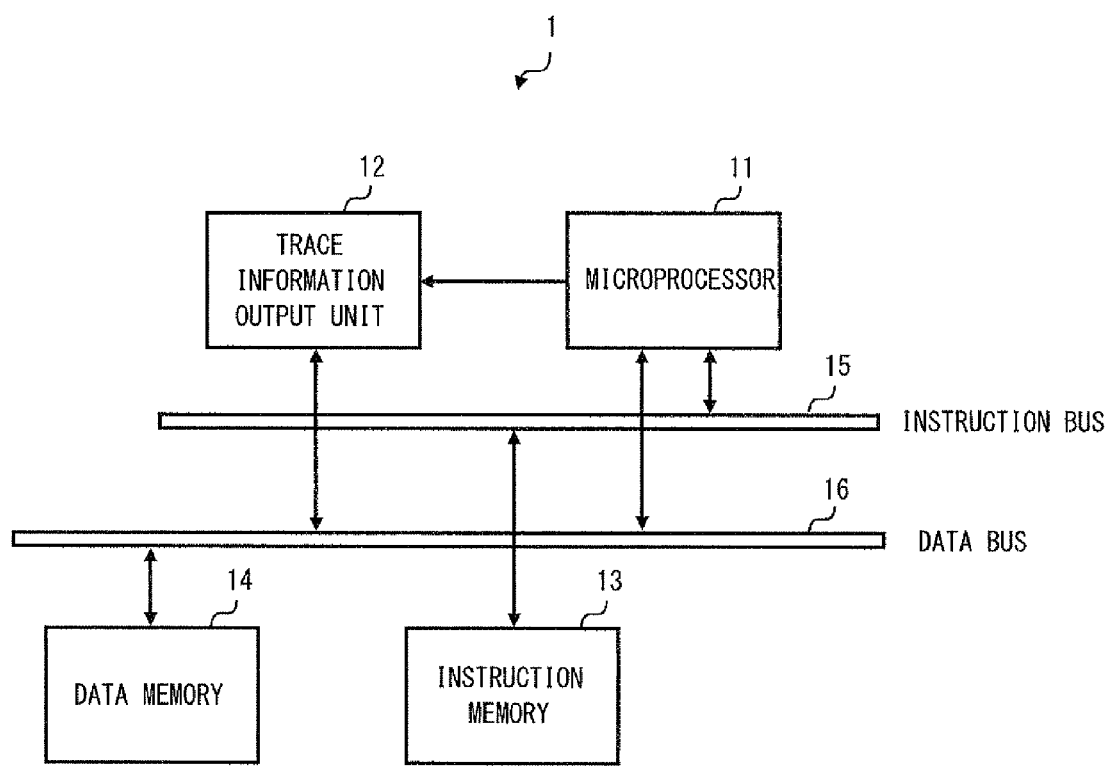
FIG. 1 is a diagram illustrating a configuration example of a semiconductor device according to a first embodiment of the present invention.

Hereinafter, embodiments of the present invention will be described with reference to the accompanying drawings. The drawings are in simplified form, and the technical scope of the present invention should not be interpreted to be limited to the drawings. The same elements are denoted by the same reference numerals, and a repeated explanation is omitted.

The invention will be described by being divided into a plurality of sections or embodiments whenever circumstances require it for convenience in the following embodiments. However, unless otherwise specified in particular, they are not irrelevant to one another. One thereof has to do with modifications, applications, details, supplementary explanations, and the like of some or all of the other. When reference is made to the number of elements or the like (including the number of pieces, numerical values, quantity, range, etc.) in the following embodiments, the number thereof is not limited to a specific number and may be greater than or less than or equal to the specific number unless otherwise specified in particular and definitely limited to the specific number in principle.

Further, in the following embodiments, components (including operation steps, etc.) are not always essential unless otherwise specified in particular and considered to be definitely essential in principle. Similarly, when reference is made to the shapes, positional relations, and the like of the components or the like in the following embodiments, they will include ones substantially approximate or similar to their shapes or the like unless otherwise specified in particular and considered not to be definitely so in principle, for example. This is similarly applied even to the above-described number or the like (including the number of pieces, numerical values, quantity, range, etc.).

First Embodiment

FIG. 1 is a diagram illustrating a configuration example of a semiconductor device according to a first embodiment of the present invention. A semiconductor device 1 according to the first embodiment includes a trace information output unit that acquires address information of an instruction memory specified before branching when a branch instruction is generated in a microprocessor, and outputs the acquired address information as trace information. This trace information is written into a data memory through a data bus in a period in which the microprocessor does not access the data memory during execution of the branch instruction. This eliminates the need for the semiconductor device 1 according to the first embodiment to include another dedicated memory for holding (storing) the trace information, which enables suppression of an increase in cost. This configuration will be described in detail below.

The semiconductor device 1 illustrated in FIG. 1 includes a microprocessor 11, a trace information output unit 12, an instruction memory (first memory) 13, a data memory (second memory) 14, an instruction bus (first bus) 15, and a data bus (second bus) 16.

The instruction memory 13 stores a plurality of instructions (program data) including branch instructions. The instruction memory 13 is connected to the instruction bus 15. The instruction bus 15 includes an address transmission bus that transmits an address signal for specifying the address of the instruction memory 13, and a data transmission bus that transmits the instructions (program data) stored in the instruction memory 13, for example.

The data memory 14 temporarily stores data processed in the microprocessor. The data memory 14 is connected to the data bus 16. The data bus 16 includes an address transmission bus that transmits an address signal for specifying the address of the data memory, and a data transmission bus that transmits data to be written into the data memory 14 or data read from the data memory 14, for example.

The microprocessor 11 is connected to each of the instruction bus 15 and the data bus 16. The microprocessor 11 fetches an instruction at a specified address among a plurality of instructions stored in the instruction memory 13, through the instruction bus 15, and executes processing according to the instruction. Then, the microprocessor 11 accesses the data memory 14 through the data bus 16 based on the execution result. For example, the microprocessor 11 writes the data generated by executing the process according to the instruction, into the data memory 14 through the data bus 16. Alternatively, the microprocessor 11 loads data required by the execution of the processing according to the instruction, from the data memory 14 through the data bus 16.

Further, the microprocessor 11 outputs information indicating whether a branch instruction is generated or not to the trace information output unit 12.

When a branch instruction is generated in the microprocessor 11, the trace information output unit 12 loads the address information of the instruction memory 13, which is specified before branching, and outputs the loaded information as trace information. The trace information output unit 12 is connected to the data bus 16. For example, the trace information output unit 12 loads the address information on the instruction bus 15 in synchronization with the generation of the branch instruction in the microprocessor 11, and outputs the loaded information as trace information.

The trace information output from the trace information output unit 12 is written into the data memory 14 through the data bus 16 in a period in which the microprocessor 11 does not access the data memory 14 during the execution of the branch instruction. The trace information written into the data memory 14 is thereafter analyzed to thereby debug a program.

Figure 2:
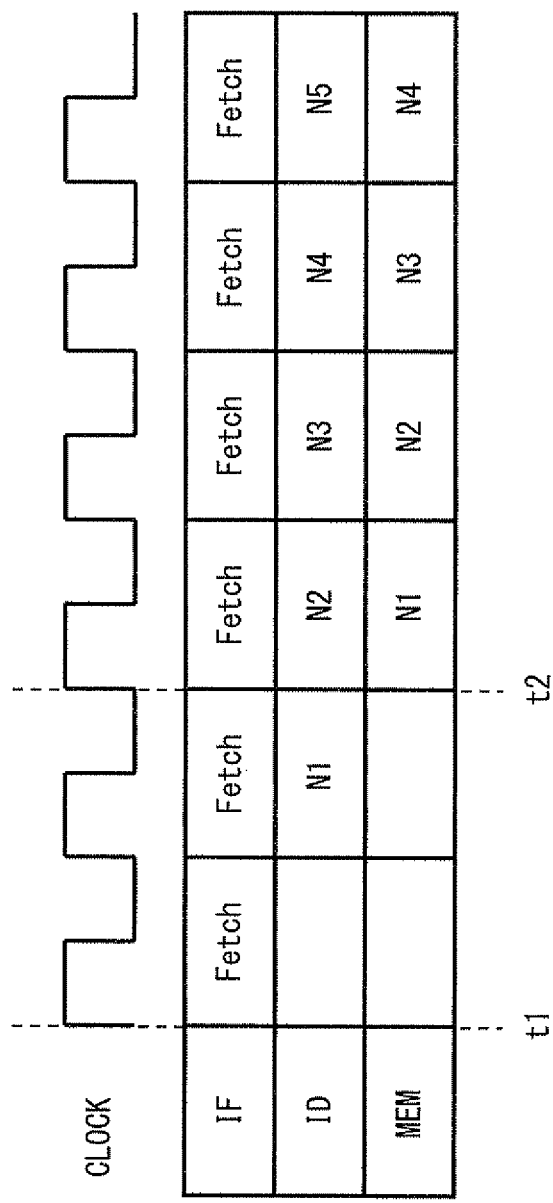
FIG. 2 is a diagram illustrating an exemplary operation of the semiconductor device according to the first embodiment of the present invention.

FIG. 2 is a timing diagram illustrating an exemplary operation of the semiconductor device 1 illustrated in FIG. 1. Note that the horizontal axis represents time and the longitudinal axis represents a sequential instruction sequence toward the bottom of the drawing sheet. In addition, "IF" represents an access to the instruction memory 13; "ID" represents decoding of an instruction"; and "MEM" represents an access to the data memory 14. As illustrated in FIG. 2, in the semiconductor device 1, the microprocessor 11 executes a plurality of instructions by pipeline processing.

When a branch instruction is generated in the microprocessor 11, the microprocessor 11 switches the instruction from the instruction before branching to the instruction after branching, and executes the instruction. Accordingly, a data loading period is generated during the period between the time when the microprocessor 11 fetches the instruction after branching and the time when the microprocessor 11 accesses the data memory 14 based on the execution result of the instruction (between times t1 and t2). That is, the period in which the microprocessor 11 does not access the data memory 14 is generated. During this period, the trace information output from the trace information output unit 12 is written into the data memory 14 through the data bus 16. This allows the semiconductor device 1 illustrated in FIG. 1 to write the trace information into the data memory 14 without competing with the access from the microprocessor 11.

Thus, in the semiconductor device 1 according to the first embodiment, the trace information is written into the data memory 14 through the data bus 16 in the period in which the microprocessor 11 does not access the data memory 14 during the execution of the branch instruction. This eliminates the need for the semiconductor device 1 according to the first embodiment to include another dedicated memory for holding (storing) the trace information, which enables suppression of an increase in cost.

Note that in the first embodiment, the trace information output unit 12 loads only the address information of the instruction memory 13 before branching when a branch instruction is generated, and outputs the loaded information as trace information. In other words, the trace information output unit 12 does not load any other address information. However, debugging of the program involving the branch instruction enables removal of almost all bugs from the program. Therefore, a sufficient debug effect can be expected also in the configuration of the first embodiment.

Figure 3:
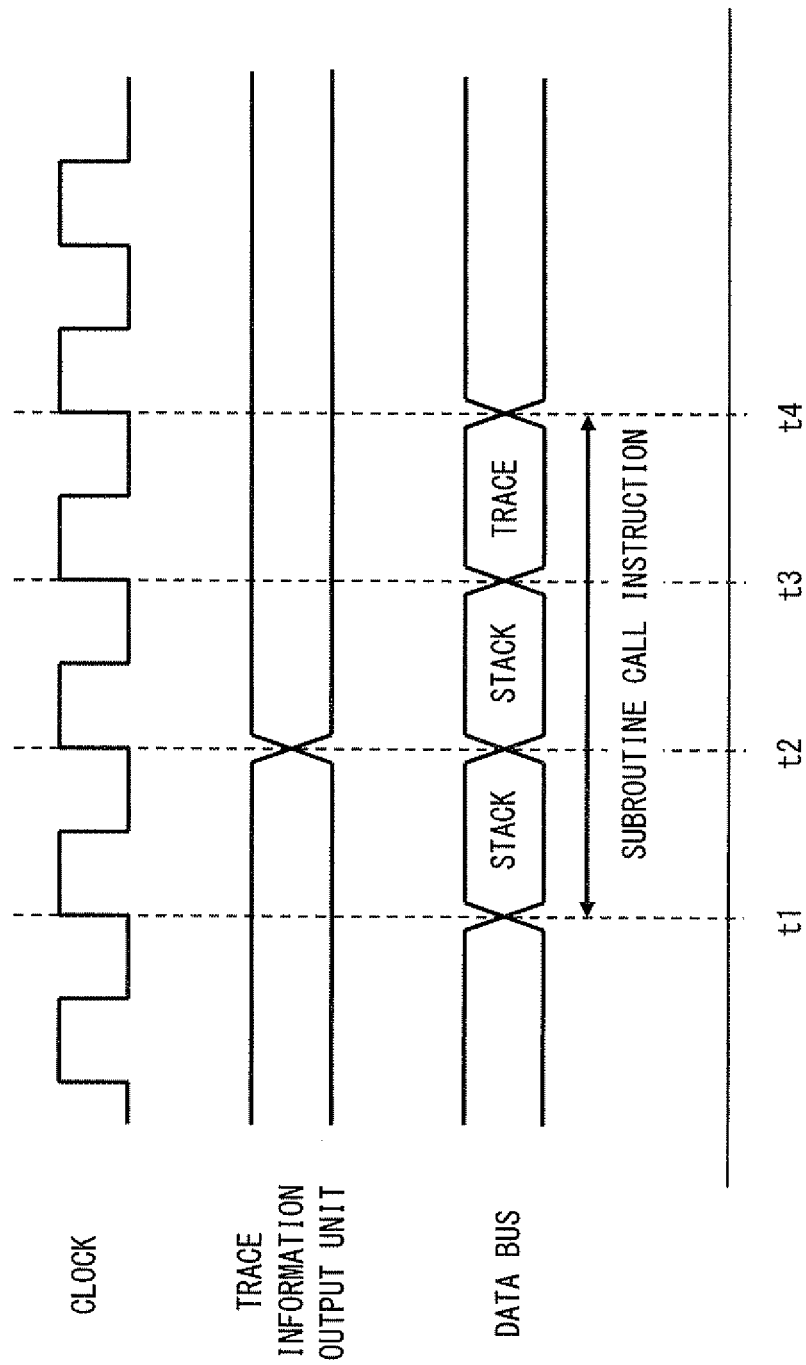
FIG. 3 is a diagram illustrating an exemplary operation of the semiconductor device according to the first embodiment of the present invention.

The branch instruction also includes an instruction for instructing the microprocessor 11 to access the data memory 14 to store the state before branching, such as a subroutine call instruction, for example (see FIG. 3). However, even in the case of the subroutine call instruction, the microprocessor 11 accesses the data memory 14 only in the first two cycles of three clock cycles, and the microprocessor 11 does not access the data memory 14 in the last one clock cycle, for example. Accordingly, the trace information may be written into the data memory 14 in the period of last one clock cycle.

In the example illustrated in FIG. 3, at time t1, a branch instruction (subroutine call instruction) is generated. Accordingly, the trace information output unit 12 loads the address information of the instruction memory 13, which is specified before branching, and outputs the located information as trace information (time t2). After that, the trace information is written into the data memory 14 through the data bus 16 in the period (between times t3 and t4) in which the microprocessor 11 does not access the data memory 14.

Second Embodiment

Figure 4:
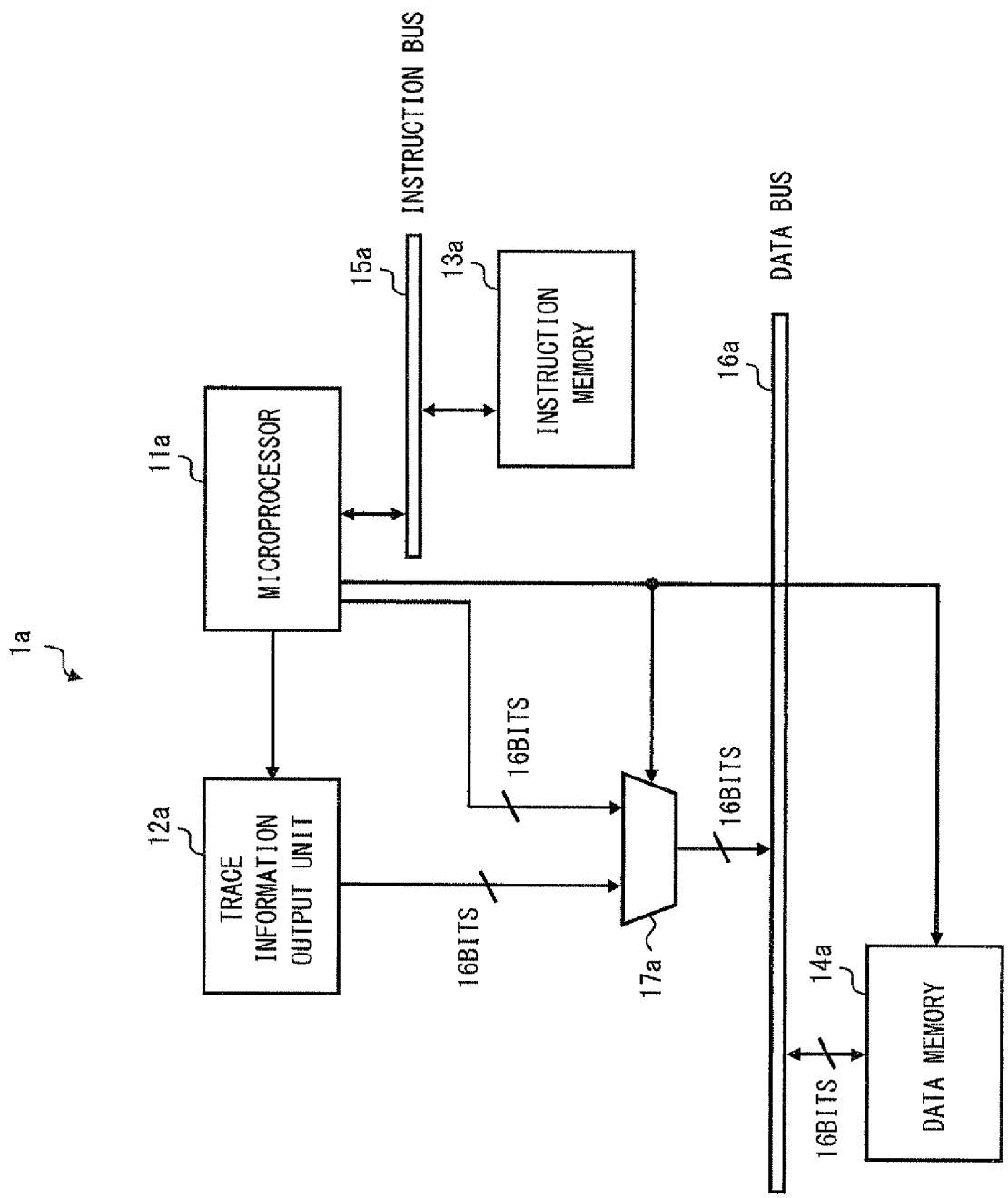
FIG. 4 is a diagram illustrating a configuration example of a semiconductor device according to a second embodiment of the present invention.

FIG. 4 is a diagram illustrating a configuration example of a semiconductor device according to a second embodiment of the present invention. FIG. 4 illustrates a semiconductor device 1a as a specific configuration example of the semiconductor device 1 illustrated in FIG. 1. The semiconductor device 1a will be described in detail below.

The semiconductor device 1a illustrated in FIG. 4 includes a microprocessor 11a, a trace information output unit 12a, an instruction memory 13a, a data memory 14a, an instruction bus 15a, a data bus 16a, and a selection circuit 17a. The microprocessor 11a, the trace information output unit 12a, the instruction memory 13a, the data memory 14a, the instruction bus 15a, and the data bus 16a correspond to the microprocessor 11, the trace information output unit 12, the instruction memory 13, the data memory 14, the instruction bus 15, and the data bus 16, respectively, which are illustrated in FIG. 1.

The second embodiment illustrates a case in which the instruction bus 15a (more specifically, the address transmission bus of the instruction bus 15a) has a bit width of 16 bits and the data bus 16a (more specifically, the data transmission bus of the data bus 16a) has a bit width of 16 bits.

In this case, the trace information output unit 12a loads the address information (16-bit width) of the instruction memory 13a before branching when a branch instruction is generated, and outputs trace information having a 16-bit width. The microprocessor 11a writes data having a 16-bit width into the data memory 14a, or reads data having a 16-bit width from the data memory 14a.

The microprocessor 11a outputs information indicating whether a branch instruction is generated or not to the trace information output unit 12a, and outputs a write signal for performing control as to whether or not to write the trace information into the data memory 14a. Specifically, the microprocessor 11a activates the write signal in a period in which the microprocessor 11a does not access the data memory 14a during execution of the branch instruction, and deactivates the write signal in the other cases.

The selection circuit 17a sets a signal path between one of the trace information output unit 12a and the microprocessor 11a to be selected based on the write signal, and the data bus 16a. For example, when the write signal is inactive, the selection circuit 17a sets a signal path between the microprocessor 11a and the data bus 16a. This enables access from the microprocessor 11a to the data memory 14a. On the other hand, when the write signal is active, the selection circuit 17a sets a signal path between the trace information output unit 12a and the data bus 16a. As a result, the trace information output from the trace information output unit 12a is supplied to the data memory 14a.

When the write signal is active, the trace information output from the trace information output unit 12a is written into the data memory 14a.

The other circuit configurations and operations of the semiconductor device 1a illustrated in FIG. 4 are similar to those of the semiconductor device 1 illustrated in FIG. 1, so the description thereof is omitted.

Thus, the semiconductor device 1a according to the second embodiment can provide the same effects as those of the first embodiment. Note that the same effects can be obtained even when the bit width of the instruction bus 15a (more specifically, the address transmission bus of the instruction bus 15a) is smaller than the bit width of the data bus 16a (more specifically, the data transmission bus of the data bus 16a).

Third Embodiment

Figure 5:
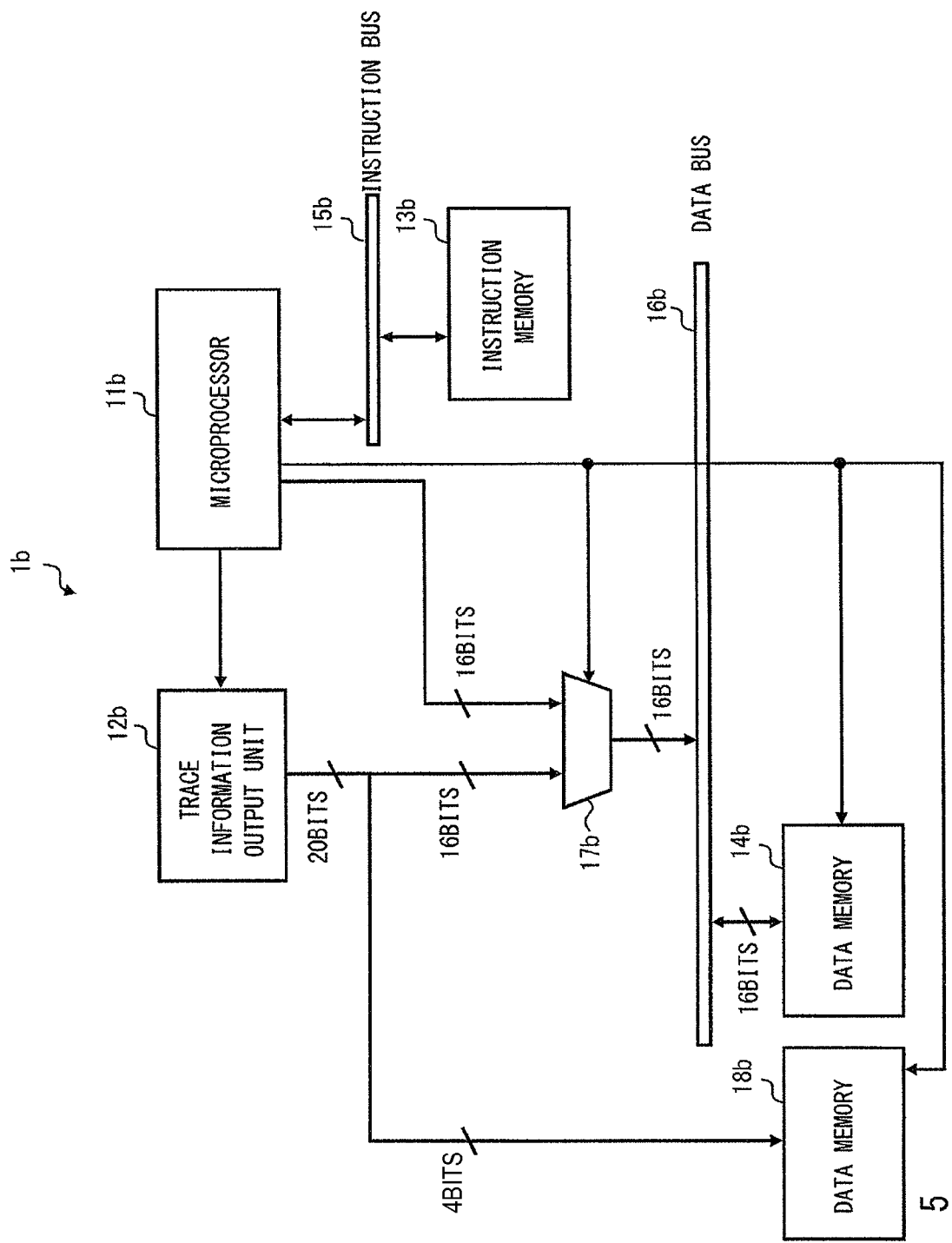
FIG. 5 is a diagram illustrating a configuration example of a semiconductor device according to a third embodiment of the present invention.
Figure 6:
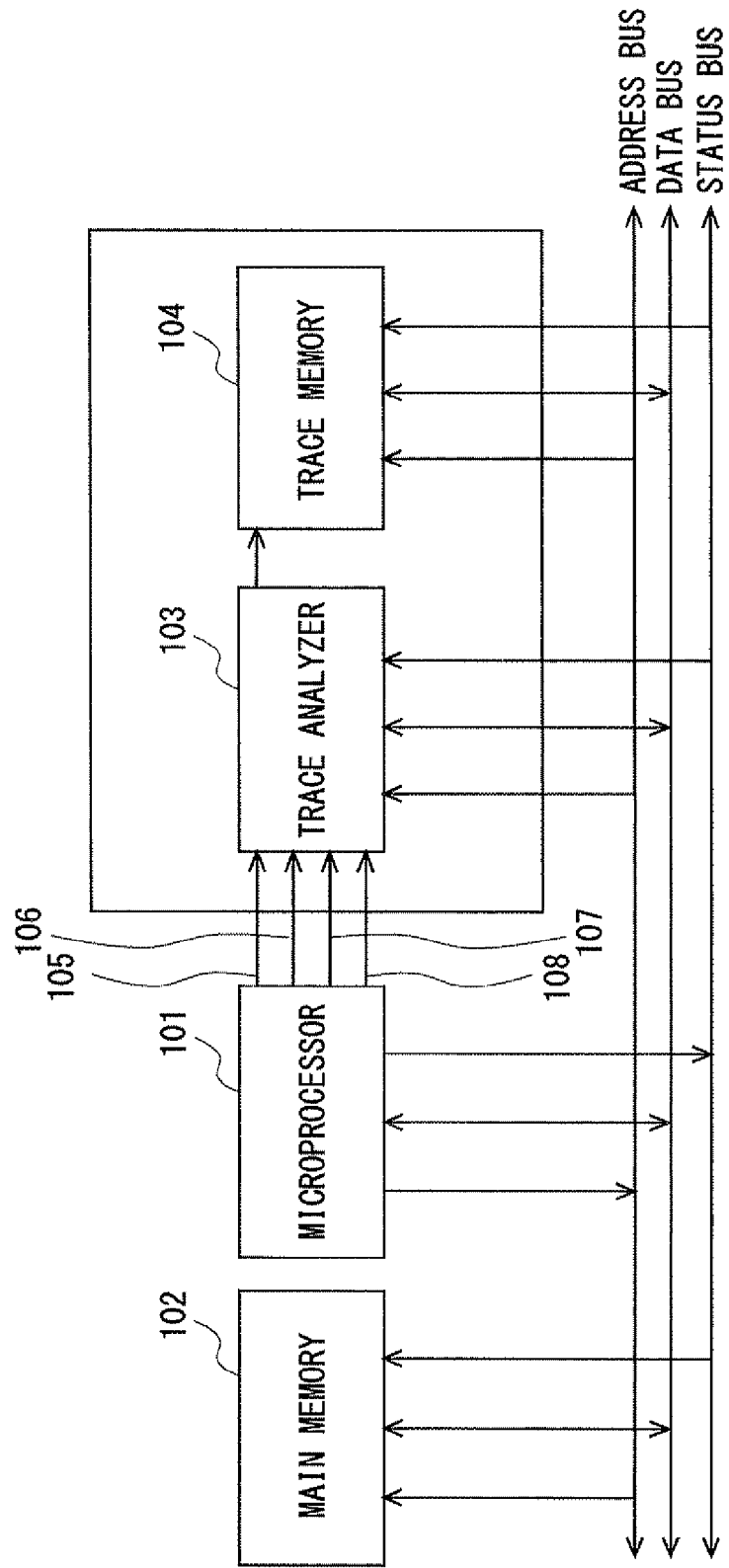
FIG. 6 is a diagram illustrating a trace system of a related art.

FIG. 5 is a diagram illustrating a configuration example of a semiconductor device according to a third embodiment of the present invention. A semiconductor device 1b illustrated in FIG. 5 is different from the semiconductor device 1a illustrated in FIG. 4 in that the instruction bus (more specifically, the address transmission bus of the instruction bus) has a bit width greater than that of the data bus (more specifically, the data transmission bus of the data bus).

The semiconductor device 1b illustrated in FIG. 5 has the same circuit configuration as that of the semiconductor device 1a illustrated in FIG. 4, except that a data memory 18b is added. A microprocessor 11b, a trace information output unit 12b, an instruction memory 13b, a data memory 14b, an instruction bus 15b, and a data bus 16b correspond to the microprocessor 11a, the trace information output unit 12a, the instruction memory 13a, the data memory 14a, the instruction bus 15a, and the data bus 16a, respectively, which are illustrated in FIG. 4.

The third embodiment illustrates a case in which the instruction bus 15b (more specifically, the address transmission bus of the instruction bus 15b) has a bit width of 20 bits and the data bus 16b (more specifically, the data transmission bus of the data bus 16b) has a bit width of 16 bits.

In this case, since the data bus 16b has a 16-bit width, trace information having a 20-bit width cannot be directly transmitted to the data memory 14b through the data bus 16b. Accordingly, the trace information output unit 12b loads address information (20-bit width) of the instruction memory 13b before branching when a branch instruction is generated, and outputs the information as first trace information having a 16-bit width and second trace information having a four-bit width. The first trace information having a 16-bit width is input to a selection circuit 17b, and the second trace information having a four-bit width is directly supplied to the data memory 18b.

When the write signal is active, the first trace information having a 16-bit width is supplied to the data memory 14b through the data bus 16b, as with the case of FIG. 4. When the write signal is active, the first trace information having a 16-bit width is written into the data memory 14a. Further, when the write signal is active, the second trace information having a four-bit width is written into the second data memory 18b. If the second trace information is not included in the trace information, no information may be written into the data memory 18b.

The other circuit configurations and operations of the semiconductor device 1b illustrated in FIG. 5 are similar to those of the semiconductor device 1a illustrated in FIG. 4, so the description thereof is omitted.

Thus, the semiconductor device 1b according to the third embodiment can provide the same effects as those of the first embodiment. Note that the data memory 18b can be used not only for holding the trace information but also for storing other data. That is, the data memory 18b need not necessarily be a dedicated memory for holding the trace information.

As described above, in the semiconductor devices according to the first to third embodiments, the trace information is written into the data memory through the data bus in the period in which the microprocessor does not access the data memory, before and after the execution of the branch instruction. This eliminates the need for the semiconductor devices according to the first to third embodiments to include another dedicated memory for holding (storing) the trace information, which enables suppression of an increase in cost.

Note that the present invention is not limited to the embodiments described above, but maybe modified as needed without departing from the gist of the present invention.

The first, second and third embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
a first memory that stores a plurality of instructions;
a second memory that stores a plurality of data items;
a first bus and a second bus;
a microprocessor that fetches, through the first bus, an instruction at a specified address among the plurality of instructions stored in the first memory, executes the instruction, and accesses the second memory through the second bus based on a result of the execution; and
a trace information output unit that acquires, when a branch instruction is generated in the microprocessor, address information of the first memory specified before branching, and outputs the address information as trace information,
wherein the trace information output from the trace information output unit is written into the second memory through the second bus in a period in which the microprocessor does not access the second memory during execution of the branch instruction.

2. The semiconductor device according to claim 1, wherein the period in which the microprocessor does not access the second memory during execution of the branch instruction is a period between a time when the microprocessor fetches an instruction after branching and a time when the microprocessor accesses the second memory based on the execution result of the instruction.

3. The semiconductor device according to claim 1, wherein the trace information output unit outputs first memory address information on the first bus before branching as the address information of the first memory specified before branching.

4. The semiconductor device according to claim 1, wherein the microprocessor executes a plurality of instructions by pipeline processing.

5. The semiconductor device according to claim 1, further comprising a selection circuit that sets a signal path between one of the trace information output unit and the microprocessor, and the second bus.

6. The semiconductor device according to claim 1, wherein the trace information output unit acquires the address information by reading first memory address information on the first bus in synchronization with the generation of the branch instruction by the microprocessor, and outputs the address information as the trace information by outputting the read first memory address information as the trace information.

7. A control method of a semiconductor device, the semiconductor device comprising:
a first memory that stores a plurality of instructions;
a second memory that stores a plurality of data items;
a first bus and a second bus;
a microprocessor that fetches, through the first bus, an instruction at a specified address among the plurality of instructions stored in the first memory, executes the instruction, and accesses the second memory through the second bus based on a result of the execution; and
a trace information output unit that outputs trace information,
the method comprising:
acquiring, when a branch instruction is generated in the microprocessor, address information of the first memory specified before branching, and outputting the address information as the trace information; and
writing the trace information output from the trace information output unit into the second memory through the second bus in a period in which the microprocessor does not access the second memory during execution of the branch instruction.

8. The control method of a semiconductor device according to claim 7, wherein the period in which the microprocessor does not access the second memory during execution of the branch instruction is a period between a time when the microprocessor fetches an instruction after branching and a time when the microprocessor accesses the second memory based on the execution result of the instruction.

9. The control method of a semiconductor device according to claim 7, wherein the outputting the address information as the trace information comprises the trace information output unit outputting first memory address information on the first bus before branching as the address information of the first memory specified before branching.

10. The control method of a semiconductor device according to claim 7, wherein the microprocessor executes a plurality of instructions by pipeline processing.

11. The control method of claim 7, further comprising:
selectively setting a signal path between one of the trace information output unit and the microprocessor, and the second bus.

12. The control method of claim 7, wherein the acquiring the address information comprises reading first memory address information on the first bus in synchronization with the generation of the branch instruction by the microprocessor, and
the outputting the address information as the trace information comprises outputting the read first memory address information as the trace information.

* * * * *